Sept. 9, 1958     S. B. COHN     2,851,681
DIVERSITY POLARIZATION RADAR SYSTEM
Filed March 16, 1955
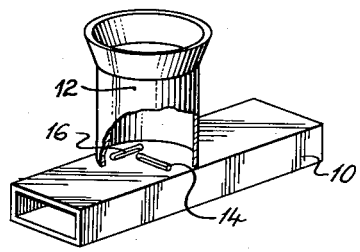
Fig. 1.
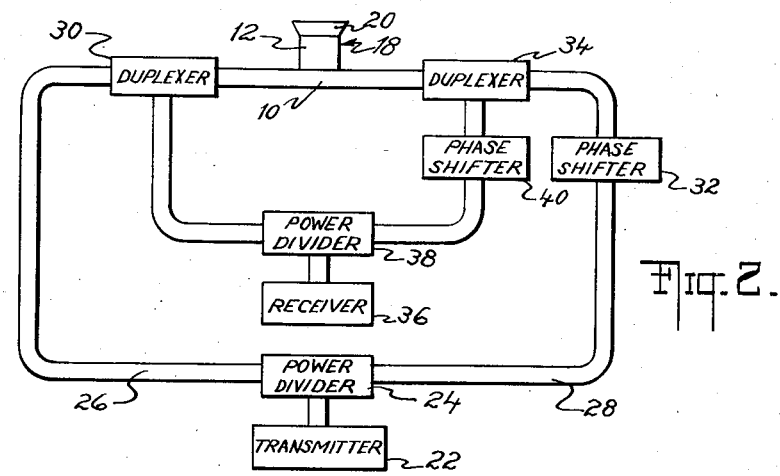
Fig. 2.
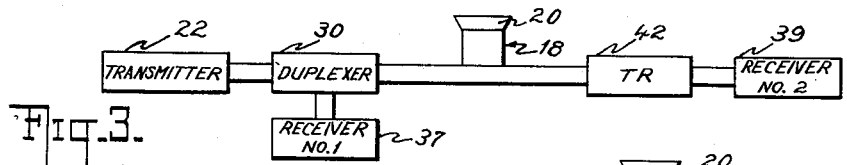
Fig. 3.
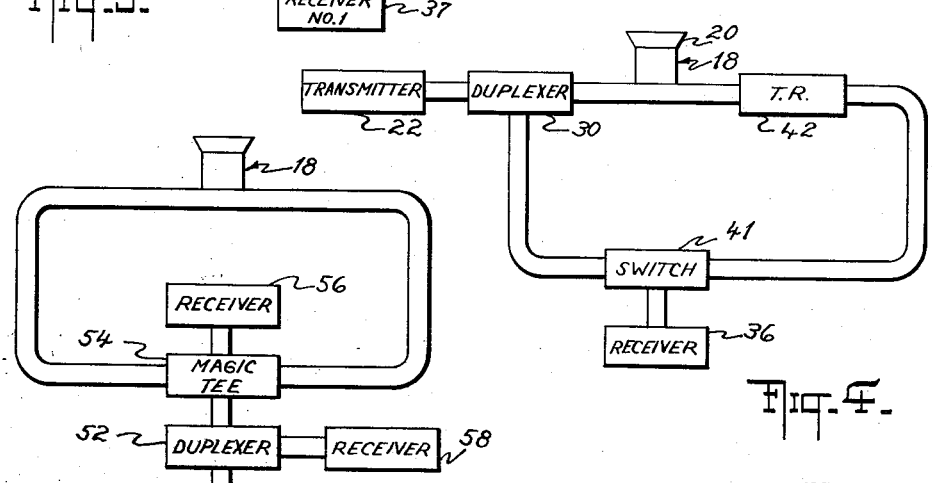
Fig. 4.
Fig. 5.
INVENTOR
SEYMOUR B. COHN
BY
ATTORNEY United States Patent Office 2,851,681
Patented Sept. 9, 1958

2,851,681

DIVERSITY POLARIZATION RADAR SYSTEM

Seymour B. Cohn, Palo Alto, Calif., assignor to Sperry Rand Corporation, a corporation of Delaware Application March 16, 1955, Serial No. 494,656

14 Claims. (Cl. 343—5)

This invention relates to the diversity polarization radar, and more particularly, is concerned with apparatus for selectively transmitting and/or receiving microwave energy of linearly, circularly, or elliptically polarized waves.

It is a known phenomenon that the plane of polarization of electromagnetic energy may become rotated by a reflection from certain types of objects, or that the direction of rotation of circularly polarized energy may be reversed upon reflection from certain types of objects. Diversity polarization radar systems have heretofore been proposed for investigating these phenomena and to provide means for obtaining additional information regarding the properties of the target material and surface from which echo pulses are received to achieve improved identification of targets or target areas.

It is a general object of this invention to provide an improved diversity polarization radar system which is characterized by its simplicity of design and construction, its versatility and reliability.

Another object of this invention is to provide radar apparatus for selectively transmitting microwave energy in circularly polarized waves of either direction of rotation, elliptically polarized waves, or plane polarized waves at any selected angle.

Another object of this invention is to provide radar apparatus for selectively receiving microwave energy transmitted in circularly polarized waves of either direction of rotation, elliptically polarized waves, or plane polarized waves of any predetermined angle.

These and other objects of the invention which will become apparent as the description proceeds are achieved by the provision of apparatus including a section of rectangular wave guide and a section of circular wave guide joined at one end to a broad wall of the rectangular wave guide, the broad wall of the rectangular wave guide section having a pair of resonant slots oriented at right angles to each other. Means including an adjustable phase shifter couples a microwave source to opposite ends of the rectangular wave guide section, and similar means including an adjustable phase shifter couples the receiver to opposite ends of the rectangular wave guide section. A pair of duplexers are provided to give isolation between the source and the receiver.

For a better understanding of the invention reference should be had to the accompanying drawings, wherein:

Fig. 1 is a perspective view, partly in section, of a rectangular-to-circular wave guide junction;

Fig. 2 is a diagrammatic representation of one embodiment of the present invention; and Figs. 3, 4 and 5 are diagrammatic representations of alternative embodiments of the present invention.

Referring to Fig. 1, the numeral 10 indicates a section of rectangular wave guide designed to propagate energy in the $TE_{10}$ mode at a design frequency of $f_0$. Joined at right angles to one of the broad walls of the wave guide 10 is a section of circular wave guide 12, the two wave guide sections being joined so that their longitudinal axes intersect at right angles to each other. Coupling is provided between the two wave guide sections by means of a pair of resonant slots 14 and 16. The slot 14 extends in a direction transverse to the axis of the wave guide 10 with its center positioned substantially along the longitudinal axis of the circular wave guide 12. The slot 16 is positioned parallel to and adjacent one of the narrow walls of the rectangular wave guide 10, and at one end of the slot 14.

With the slot 14 providing coupling to the longitudinal electric currents in the wave guide section 10 and with the slot 16 providing coupling to the transverse currents in the wave guide 10, it can be shown that all of the energy transmitted in the dominant mode in one direction in the rectangular wave guide is coupled into the circular wave guide as a circularly polarized wave. The direction of propagation in the rectangular wave guide can be shown to determine the direction of rotation of the circularly polarized wave in the circular wave guide. The direction of rotation of a circularly polarized wave incident at the coupler can be shown to determine the direction of propagation in the rectangular wave guide. Moreover, if waves of equal amplitude converge on the junction from opposite ends of the rectangular wave guide section 10, a linearly polarized wave is produced in the circular wave guide section, the spacial angle of the electric field vector depending on the relative phase of the two incident waves. If the two incident waves are unequal in amplitude, an elliptically polarized wave is produced in the circular wave guide. A junction having the properties of the above described junction of Fig. 1, is the subject of copending application Serial No. 472,475 filed December 1, 1954, in the name of Seymour B. Cohn.

In Fig. 2 a junction of the type above described is indicated generally at 18. The circular wave guide portion 12 is terminated in a horn 20 for radiating energy into space. A source 22 of microwave energy, such as a pulsed magnetron oscillator or other well known means for generating ultra high frequency energy, is connected to the input of an adjustable power divider 24 which proportions the energy output of the transmitter 22 between two wave guide sections 26 and 28. The wave guide 26 is coupled to the wave guide 10 of the junction 18 through a duplexer 30, while the other output of the power divider 24 is connected through the wave guide section 28 to a phase shifter 32 of a suitable type for adjusting the phase of the incident energy by any preselected amount up to 180°. The output of the phase shifter 32 is connected to the opposite end of the wave guide section 10 of the junction 18 through a second duplexer 34.

In operation, if the power divider 24 is adjusted to divide the output of the transmitter 22 into two waves of equal amplitude, the output of the horn 20, according to the manner of the operation of the junction 18 as above described, is a linearly polarized wave. The angle of polarization can be varied to any preselected value by means of the phase shifter 32. On the other hand, if the power divider 24 is adjusted to couple all of the energy from the source 22 to one side of the junction 18, circularly polarized energy is radiated from the horn 20, the direction of rotation depending upon whether the power divider 24 is set to couple energy to the wave guide 26 or the wave guide 28. Any intermediate setting of the power divider 24 produces an elliptically polarized wave at the output of the horn 20.

Reception by the same horn 20 and junction 18 is provided by a microwave receiver 36 connected to a power divider 38. One side of the power divider 38 is connected to the low power output terminal of the duplexer 30, while the other side of the power divider is connected by a phase shifter 40 to the low power output terminal of the duplexer 34.

In operation, linearly polarized waves received at the horn 20 divide equally at the junction 18 into two components which are coupled by the duplexers 30 and 34 to opposite sides of the power divider 38. If the power divider is set for equal power division and the phase shifter 40 is set to the proper phase depending on the angle of polarization of the received wave at the horn 20, a maximum signal will be indicated by the receiver 36. Thus, by calibration of the power divider 38 and phase shifter 40, the presence of a linearly polarized wave can be detected and the angle of polarization can be determined.

If the received wave is circularly polarized all of the energy of the received wave will be coupled to either one side or the other of the power divider 38 depending upon the direction of rotation of the received circularly polarized wave. If a maximum is indicated by the receiver 36 with the power divider set at some intermediate value, it will be known that the received wave is elliptically polarized. Thus the radar apparatus of Fig. 2 permits completely independent adjustments of transmission and reception having polarization of any ellipticity and angle.

The circuit of Fig. 2 can be particularly adapted to identify rainstorms or to eliminate interference due to the presence of rain. It is a well known phenomenon that raindrop reflections reverse the direction of rotation of circularly polarized microwave energy. If the power divider 24 is set to couple all the energy to one side of the junction 18 so that circularly polarized energy is radiated, energy reflected by raindrops will be reversed and coupled to the opposite side of the junction 18, so that a maximum received signal will be indicated when the power divider 38 is adjusted to couple the receiver to the appropriate side of the junction 18. If the reflected energy is from irregular objects like planes or ships in the area, energy of both directions of rotation generally will be returned, so that the signal to rain clutter ratio will be increased by adjusting the divider 38 to couple the recived signal from the opposite side of the junction 18.

Where it is merely desired to provide a radar apparatus for use in eliminating rain clutter, the circuit of Fig. 2 can be simplified, as shown in Fig. 3, by eliminating the power divider 24 and connecting the transmitter 22 to one side of the couple 18. Separate receivers can be coupled to either side of the junction 18, or the power divider 38 can be replaced by a simple switch by means of which the receiver 36 can be connected to either one side or the other of the junction 18, as shown in Fig. 4. Of course the phase shifter 40 would have no function in this particular case. It will be noted that a simple T-R box 42 replaces one of the duplexers of Fig. 2 in the modification of Figs. 3 and 4.

It is also known that certain targets reflect primarily the cross polarization component of a linearly polarized wave. For operation where such targets are to be identified, the apparatus of Fig. 2 may be adjusted to set the power divider to divide the power equally to the two sides of the junction 18 so as to radiate linearly polarized waves. Depending on the nature of the target the reflected wave will contain predominant linearly polarized components parallel to or at right angles to the plane of the radiated waves. Which component predominates can be ascertained by setting the power divider 38 to provide equal coupling between the two waves produced by the junction 18, and the phase shifter 40 is adjusted to introduce zero and again 90° phase shift relative to the phase of the transmitted wave. The receiver 36 then will indicate which of the components of the received wave is the largest.

Apparatus for investigating this phenomenon alone results in a simplified modification as shown in Fig. 5. Here the transmitter 50 is coupled through a duplexer 52 to a hybrid junction, such as a magic tee 54, which splits the power in half coupling respective portions to the two sides of the junction 18. The reflected wave being linearly polarized is divided by the junction 18 and coupled by the hybrid junction 54 to respective receivers 56 and 58. If, due to the nature of the target the cross-polarized component predominates, the receiver 56 will give the greater indication. Otherwise the receiver 58 will give the greater indication.

Since many changes could be made in the above construction and many apparently widely different embodiments of this invention could be made without departing from the scope thereof, it is intended that all matter contained in the above description or shown in the accompanying drawings shall be interpreted as illustrative and not in a limiting sense.

What is claimed is:

1. A diversity polarization device comprising a wave guide junction including a section of rectangular wave guide, a broad wall thereof having a pair of resonant slots oriented at right angles to each other, and a section of circular wave guide joined at one end to said broad wall of the rectangular wave guide section and adapted to encircle said pair of slots, means coupled to the circular wave guide section for receiving and radiating electromagnetic energy waves, a microwave source, a first adjustable power divider, first and second duplexing means connected to opposite ends of the rectangular wave guide section, the first power divider coupling the microwave source to the respective duplexing means, a first phase shifter connected between the first power divider and one of said duplexing means for adjusting the relative phase at said junction of the two portions of energy produced by the first power divider, a second adjustable power divider, microwave receiving means coupled to the respective duplexing means by the second power divider, and a second phase shifter connected between the second power divider and one of said duplexing means for adjusting the relative phase at the second power divider between the two portions of received energy from said junction.

2. A diversity polarization device comprising a wave guide junction including a section of rectangular wave guide and a section of circular wave guide joined at one end to a broad wall of the rectangular wave guide section, and means for coupling all of the energy propagated in one direction in the rectangular wave guide to the circular wave guide, said means launching circularly polarized energy in the circular wave guide section, means coupled to the circular wave guide section for receiving and radiating electromagnetic energy waves, a microwave source, a first adjustable power divider, first and second duplexing means connected to opposite ends of the rectangular wave guide section, the first power divider coupling the microwave source to the respective duplexing means, a first phase shifter connected between the first power divider and one of said duplexing means for adjusting the relative phase at said junction of the two portions of energy produced by the first power divider, a second adjustable power divider, microwave receiving means coupled to the respective duplexing means by the second power divider, and a second phase shifter connected between the second power divider and one of said duplexing means for adjusting the relative phase at the second power divider between the two portions of received energy from said junction.

3. A diversity polarization device comprising a wave guide junction including a section of rectangular wave guide and a section of circular wave guide joined at one end to a broad wall of the rectangular wave guide section, and means for coupling all of the energy propagated in one direction in the rectangular wave guide to the circular wave guide, said means launching circularly polarized energy in the circular wave guide section, means coupled to the circular wave guide section for receiving and radiating electromagnetic energy waves, a microwave source, a microwave receiver, means including an adjustable phase shifter for coupling said source to opposite ends of the rectangular wave guide section, means including an adjustable phase shifter for coupling said receiver to opposite ends of the rectangular wave guide section, and duplexing means coupled to said rectangular wave guide section on either side of said junction for isolating the receiver from microwave energy direct from said source.

4. A diversity polarization device comprising a wave guide junction including a section of rectangular wave guide and a section of circular wave guide joined at one end to a broad wall of the rectangular wave guide section, and means for coupling all of the energy propagated in one direction in the rectangular wave guide to the circular wave guide, said means launching circularly polarized energy in the circular wave guide section, means coupled to the circular wave guide section for receiving and radiating electromagnetic energy waves, a microwave source, a microwave receiver, means for coupling the source to at least one end of the rectangular wave guide section, means including an adjustable phase shifter for coupling said receiver to opposite ends of the rectangular wave guide section, and duplexing means coupled to said rectangular wave guide section on either side of said junction for isolating the receiver from microwave energy direct from said source.

5. A diversity polarization device comprising a wave guide junction including a section of rectangular wave guide and a section of circular wave guide joined at one end to a broad wall of the rectangular wave guide section, and means for coupling all of the energy propagated in one direction in the rectangular wave guide to the circular wave guide, said means launching circularly polarized energy in the circular wave guide section, means coupled to the circular wave guide section for receiving and radiating electromagnetic energy waves, a microwave source, means for coupling the source to at least one end of the rectangular wave guide section, receiving means, means coupling said receiving means to opposite ends of the rectangular wave guide section, and means coupled between said receiving means and said source for isolating the receiving means from microwave energy direct from said source.

6. Radar apparatus comprising radiating means, a section of circular wave guide coupled to said radiating means, a section of rectangular wave guide having a broad wall thereof joined to one end of the circular wave guide to form a T-junction, means including a pair of longitudinal resonant slots between the circular and rectangular wave guide sections for coupling energy propagated in the dominant mode in one direction in the rectangular wave guide to energy propagated in the circularly polarized mode in the circular wave guide, and means including at least one microwave receiver coupled to opposite ends of said rectangular wave guide section for indicating the power division at the T-junction of any received signal.

7. Apparatus as defined in claim 6 wherein said last-named means includes two receivers respectively coupled to the rectangular wave guide section on opposite sides of the T-junction.

8. Apparatus as defined in claim 6 including a microwave energy source, and duplexing means coupling said source to the rectangular wave guide section on one side of the T-junction.

9. Apparatus as defined in claim 8 wherein said means including at least one microwave receiver coupled to opposite ends of said rectangular wave guide section comprises one microwave receiver and switching means for selectively coupling said microwave receiver to the rectangular wave guide section at opposite ends thereof.

10. Apparatus as in claim 6 wherein said means for coupling energy is adapted to transfer all of the energy propagated in one direction in the rectangular wave guide section to the circular wave guide section.

11. A diversity polarization device comprising a wave guide junction including a section of rectangular wave guide and a section of circular wave guide joined at one end to a broad wall of the rectangular wave guide section, and means for coupling all of the energy propagated in one direction in the rectangular wave guide to the circular wave guide, said means launching circularly polarized energy in the circular wave guide section, means coupled to the circular wave guide section for radiating and receiving electromagnetic energy waves, and receiving means coupled to opposite ends of the rectangular wave guide section.

12. A device as in claim 5 wherein said means coupling said receiving means to opposite ends of the rectangular wave guide section further includes switching means for selectively coupling said receiving means to said opposite wave guide ends.

13. A diversity polarization device comprising a wave guide junction including a section of rectangular wave guide and a second section of wave guide joined at one end to a broad wall of the rectangular wave guide section, and means for coupling all of the energy propagated in one direction in the rectangular wave guide section to the second wave guide section, said means launching circularly polarized energy in the second wave guide section, means coupled to the second wave guide section for receiving and radiating electromagnetic energy waves, a microwave source, means for coupling the source to at least one end of the rectangular wave guide section, receiving means coupled to opposite ends of the rectangular wave guide section, and means coupled between said receiving means and said source for isolating the receiving means from microwave energy direct from said source.

14. Radar apparatus comprising radiating means, a first section of wave guide coupled to said radiating means, a section of rectangular wave guide having a broad wall thereof joined to one end of said first wave guide section to form a T-junction, means for coupling all of the energy propagated in one direction in the rectangular wave guide section to the first wave guide section, said means launching circularly polarized energy in said first wave guide section, and means including at least one microwave receiver coupled to opposite ends of said rectangular wave guide section for indicating power division at the T-junction of any received signal.

References Cited in the file of this patent

UNITED STATES PATENTS

| | | |
|---|---|---|
| 2,619,635 | Chait | Nov. 25, 1952 |
| 2,782,299 | Whitehorn | Feb. 19, 1957 |